No. 784,753. PATENTED MAR. 14, 1905.
G. T. NICHOLLS.
MACHINE FOR COVERING WIRE.
APPLICATION FILED NOV. 29, 1901.

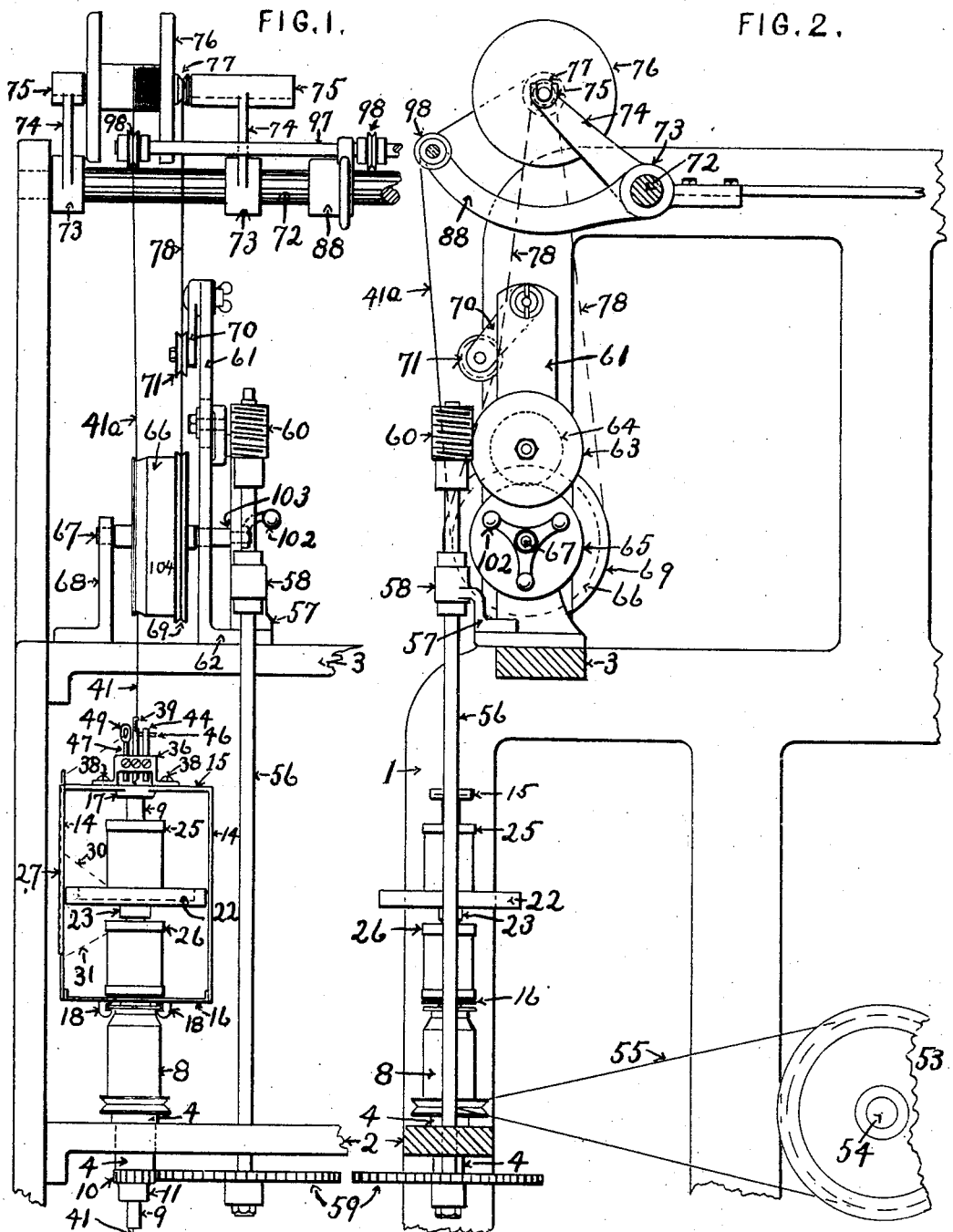

5 SHEETS—SHEET 2.

WITNESSES
Howard A. Lampley
Joseph R. Bullock Jr.

INVENTOR.
George T. Nicholls,
BY Warren R. Perce
ATTORNEY.

No. 784,753. PATENTED MAR. 14, 1905.
G. T. NICHOLLS.
MACHINE FOR COVERING WIRE.
APPLICATION FILED NOV. 29, 1901.
5 SHEETS—SHEET 3.
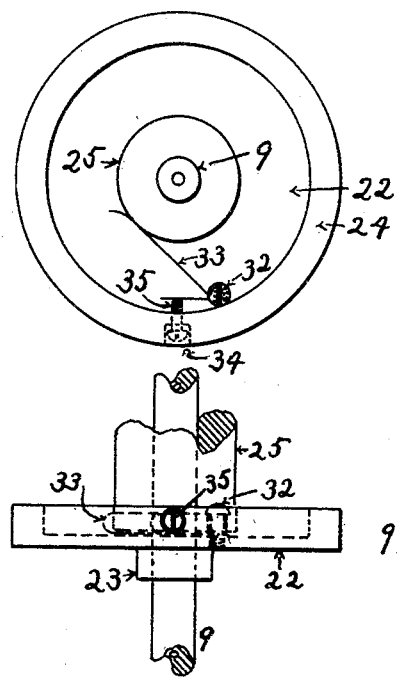
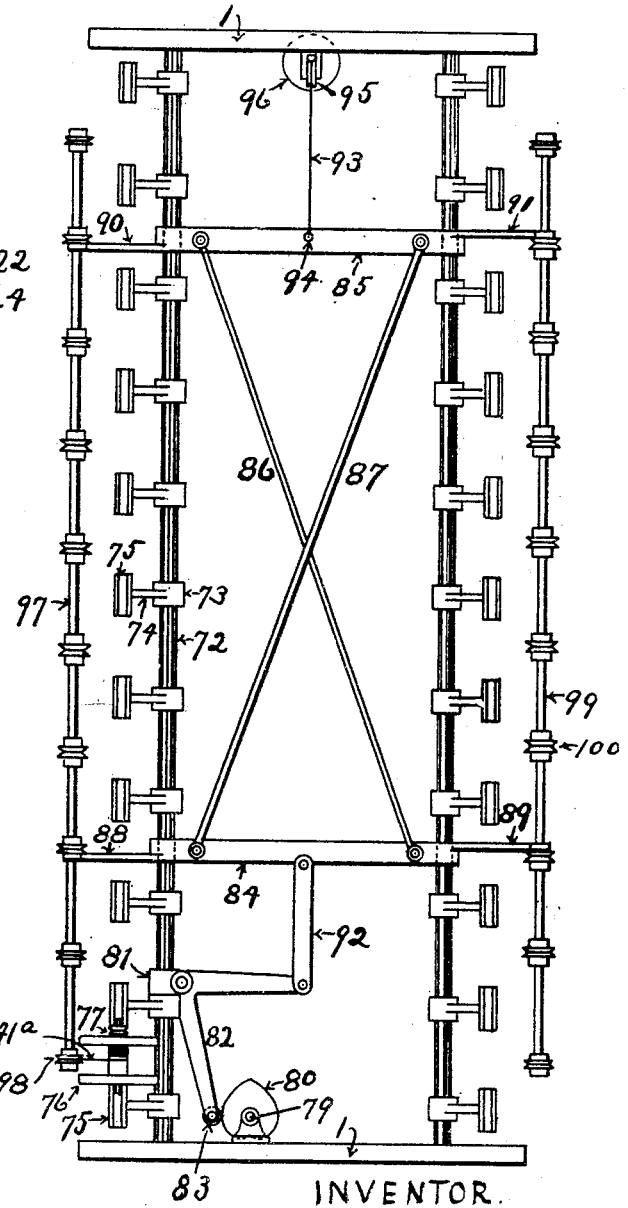

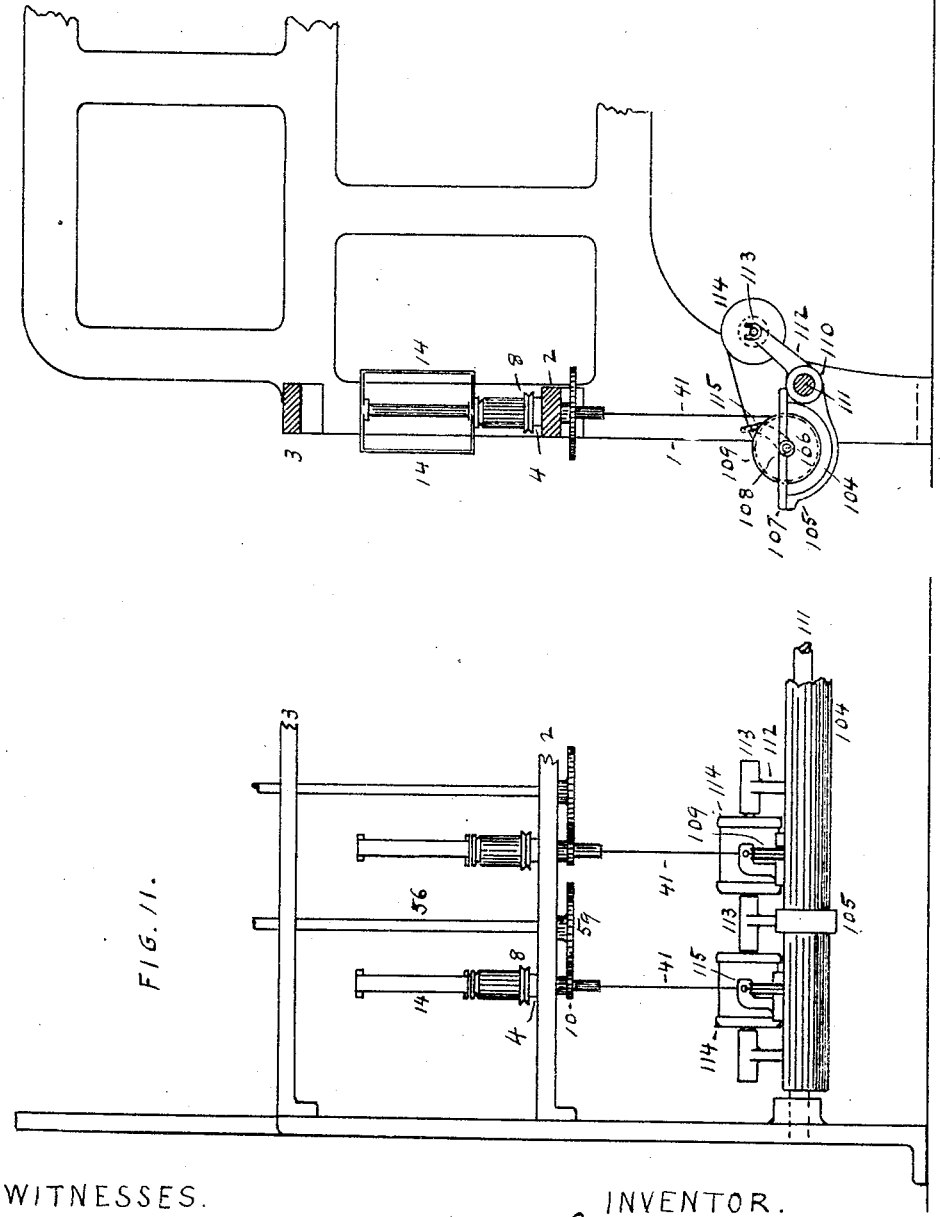

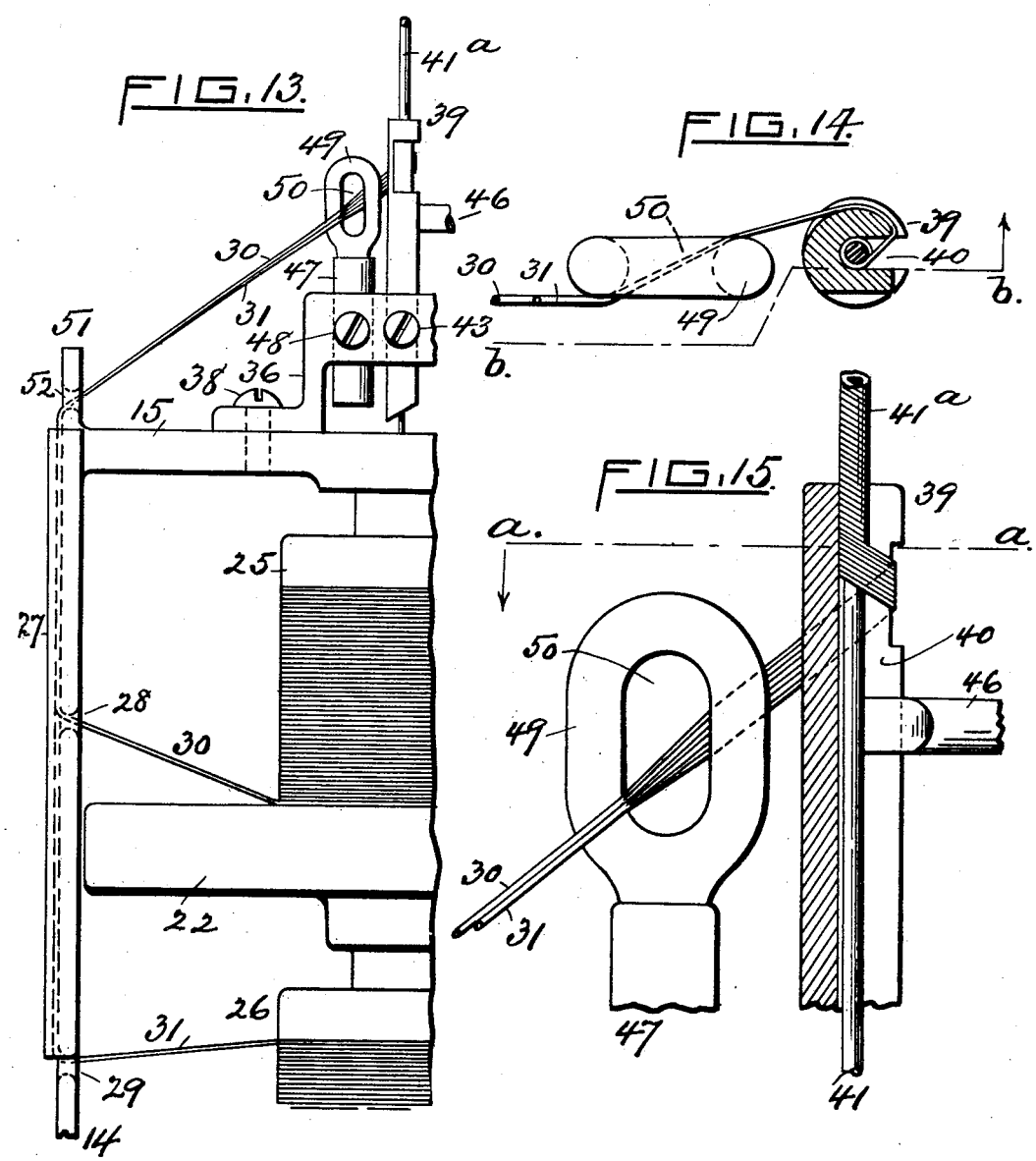

No. 784,753. Patented March 14, 1905.

UNITED STATES PATENT OFFICE.

GEORGE T. NICHOLLS, OF PROVIDENCE, RHODE ISLAND, ASSIGNOR TO PALMER-NICHOLLS COMPANY, OF CHERAW, SOUTH CAROLINA, A CORPORATION OF SOUTH CAROLINA.

MACHINE FOR COVERING WIRE.

SPECIFICATION forming part of Letters Patent No. 784,753, dated March 14, 1905.

Application filed November 29, 1901. Serial No. 84,051.

*To all whom it may concern:*

Be it known that I, GEORGE T. NICHOLLS, a citizen of the United States, residing at Providence, in the county of Providence and State of Rhode Island, have invented certain new and useful Improvements in Machines for Covering Wire, of which the following is a specification, reference being had therein to the accompanying drawings.

Like numerals indicate like parts.

Figure 5:
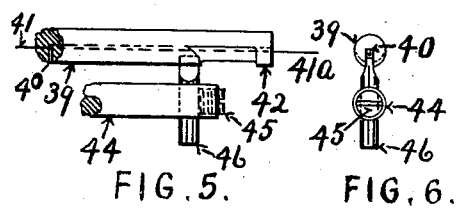
Figure 6:
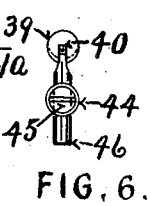
Figure 7:
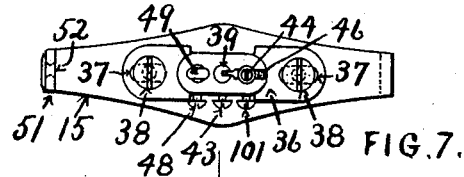
Figure 3:
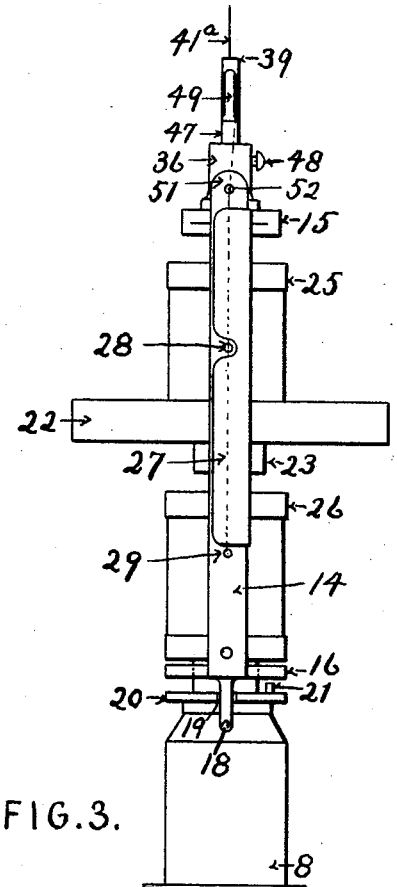
Figure 4:
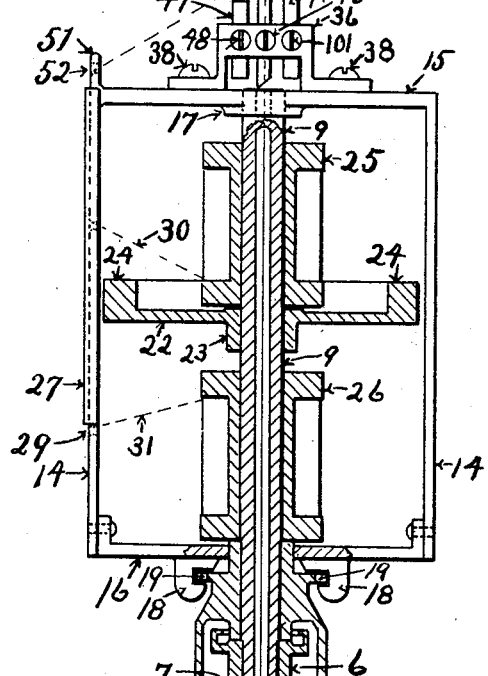

Figure 1 is a front elevation of my invention. Fig. 2 is a side elevation of the same. Fig. 3 is a side elevation of the spindle and connected parts. Fig. 4 is a central longitudinal section of the same with the flier and winding-head in front elevation. Figs. 5, 6, and 7 are detail views. Fig. 8 is a plan view of the tension device to control the paying out of the winding-threads. Fig. 9 is an elevation of the same. Fig. 10 is a top plan view of the traversing mechanism for regulating the winding of the thread-covered wire upon the spools. Fig. 11 is a front elevation of a portion of said machine, more especially illustrating the reel from which the wire is drawn, the trough wherein said wire is coated with liquid shellac, the drum, and the tension devices for feeding the wire to the winding devices; and Fig. 12 is a side elevation thereof. Fig. 13 is an enlarged view in elevation of a portion of the winding-head and spools, the porcelain eye for directing the thread, also the threads, the wire-holder, and the wire therein. Fig. 14 is a more enlarged view, as seen on line *a a* of Fig. 15, of said porcelain eye, wire-holder, and wire. Fig. 15 is a view on the same scale as Fig. 14 as seen on line *b b* of Fig. 14, showing the strands of threads, the porcelain eye, the wire, and the wire-holder.

My invention relates to machines for winding-threads upon wires to cover the same and is especially adapted for the winding of insulating-threads upon electrical wires.

It consists in the novel construction and combination of the several parts, as hereinafter particularly described and as specifically set forth in the claims.

In the drawings, 1 represents the frame of the winding-machine, 2 the spindle-rail, and 3 the capstan-rail.

The bolster is shown at 4. It passes through an aperture in the spindle-rail and rests upon said rail by its circumferential shoulder 5. The lower end of the bolster extends below the under surface of the spindle-rail, as shown in Figs. 1, 2, 3, and 4. A tubular bearing 6, having an external shoulder, is supported by the bolster 4 upon an internal shoulder thereof, as plainly illustrated in Fig. 4. The lower end of the bearing 6 is even with the lower end of the bolster 4. The bottom of the bolster 4 is open, and so is the bottom of the tubular bearing 6. The upper portion of the bolster is bored concentrically for a certain distance to afford a chamber between said bolster and bearing, and in said chamber is inserted a tubular packing 7, preferably made of cork or of other partially-elastic material. Upon the upper end of the bearing 6 is loosely mounted the whirl 8 in the usual manner. This whirl is of the usual form and construction.

The spindle 9 is slightly tapering, diminishing in diameter downward, and rests on its tapering sides in the bore of the whirl, which is adapted thus to receive it. The spindle 9 has a central bore through it from end to end, as illustrated in Fig. 4. The spindle 9 extends a considerable distance below the lower open end of the bolster 4 and the bearing 6, as seen in Figs. 1, 3, and 4, and near its lower end a gear 10 is engaged therewith, whose hub 11 extends downward upon the spindle 9. The extreme lower end of the spindle 9 is counterbored, as shown at 12 in Fig. 4, and a short tube 13 is driven up into the bore of the spindle, as shown in said figure.

The flier 14 is mounted on and is rotatable with the whirl 9. It consists of two parallel upright arms united by the upper bar or cross-head 15 and the lower cross-bar 16. The cross-head 15 has a central hub 17, which has a bore through which the spindle 9 passes, as seen in Figs. 1 and 4. The lower cross-bar 16 also has a central aperture through which the top of the tubular part of the whirl passes. The spindle, whirl, and flier thus rotate together.

The cross-bar 16 has two diametrically opposite lugs or hooks 18 on its lower side. These are adapted to enter the diametrically opposite slots 19 on an annular flange 20 near the top of the whirl 8. (See Fig. 3.) When the flier 14 has been placed in the position shown in Fig. 3, (the lugs 18 passing through the slots 19,) the flier 14 is turned a quarter-revolution until one of said lugs 18 comes in contact with the stop-pin 21, which is fixed in the flange 20 and projects upwardly therefrom.

Midway between the cross-bar 16 and the cross-bar 15 a balance-wheel 22 is mounted on the spindle 9 and rotates therewith, thus serving to give steadiness of motion to the spindle. The balance-wheel 22 has a tubular hub 23 and a comparatively thick annular flange 24. A thread-spool 25 is loosely mounted on the spindle 9 and rests upon an annular bearing at the center of the balance-wheel 22. A thread-spool 26 is also loosely mounted on the spindle 9 and rests upon an annular bearing formed by the top of the whirl at the center of the cross-bar 16.

On one of the uprights of the flier 14 is a wind-shield 27, which is preferably made of sheet metal and extends parallel with the outer surface of said upright at a little distance therefrom, as illustrated in Figs. 3 and 4. Said upright has the two thread-holes 28 and 29 through it. The thread 30 from the spool 25 passes through the thread-hole 28, and the thread 31 from the spool 26 passes through the thread-hole 29.

Near the flange 24 of the balance-wheel 22 is a screw 32, around which a flat tension-spring 33 passes and by which said spring is held. The long arm of the spring 33 presses against the rim of the spool 25. A hole is made through the side of the flange 24 (which hole is enlarged in diameter, as seen at 34 in Fig. 8) and a set-screw 35, passing through and engaging with said hole, has its bearing against the short arm of the spring 33. A similar tension-spring (not shown) is mounted on the cross-arm 16 and bears against the rim of the spool 26. Said spring 33 is omitted from Fig. 4, but fully shown in Figs. 8 and 9.

A winding-head 36 is adjustably mounted on the upper surface of the cross-head 15. Said winding-head has two parallel upright posts and two oppositely-directed feet, the latter being provided with elongated slots or apertures, as shown at 37 in Fig. 7. This winding-head is secured to the cross-head 15 by screws 38, which pass through said elongated slots 37 into the cross-head 15.

The winding-head 36 has three smooth-bored vertical holes through it. In the central one of these holes is mounted the wire-holder 39. (Shown on an enlarged scale in Figs. 5, 6, and 15.) This wire-holder 39 has a straight longitudinal slot 40, extending through one side thereof to the central or axial line and of suitable width and depth to allow the wire 41 to pass loosely therethrough. The wire-holder 39 on one side thereof is filed away, reducing its diameter slightly, as indicated by the curved dotted line in Fig. 6, thus leaving a flange or head, (marked 42 in Fig. 5 and plainly illustrated in Figs. 14 and 15.) The wire-holder 39 is adjustable in both a longitudinal and rotary direction in said central hole of the winding-head 36 and is held in its adjusted position by means of a set-screw 43, which passes through a screw-threaded hole in the side of said winding-head and has its end in forcible contact with said wire-holder.

To the right of the wire-holder 39 (as one stands fronting the machine) is an adjustable post 44, which passes through the right-hand smooth-bored hole in the winding-head 36, and said post 44 is adjustable in both a longitudinal and rotary direction in said hole and is held in its adjusted position by means of a set-screw 101, which passes through a screw-threaded hole in the side of said winding-head and has its end in forcible contact with said post. The top of the post 44 has a smooth transverse bore in which is slidably mounted the wire-guard 46, whose outer end is wedge-shaped, as shown in Fig. 15. A set-screw 45, passing through a longitudinally-extending screw-threaded hole in the top of the post 44, holds the wire-guard 46 in its adjusted position on the post 44. The operative end of the wire-guard 46 is wedge-shaped and enters the slot 40 of the wire-holder 39, as shown in Figs. 5, 6, 7, and 15.

On the left of the wire-holder 39 is mounted an adjustable post 47, which passes through the left-hand smooth-bored hole in the winding-head 36, and said post 47 is adjustable in both a longitudinal and rotary direction in said hole and is held in its adjusted position by means of a set-screw 48, which passes through a screw-threaded hole in the side of said winding-head and has its end in forcible contact with said post 47. On the top of the post 47 is a porcelain eyepiece 49, having an elongated beveled eye or opening 50.

A projection or eyepiece 51 stands up at the end of the flier 14 with an eye or opening 52 through it. The thread 31 from the spool 26 passes through the thread-hole 29 of the flier, thence through the eye 52 of the projection 51, and thence through the opening 50 of the porcelain eyepiece 49 to the wire-holder 39. The thread 30 from the spool 25 passes through the thread-hole 28 of the flier, thence through the eye 52 of the projection 51, and thence through the opening 50 of the porcelain eyepiece 49 to the wire-holder 39.

In Fig. 2 is shown a driving-pulley 53 on the main shaft 54, and a belt 55 passes around said pulley 53 and the pulley of the whirl 8.

A vertical shaft 56 is rotatably mounted in the spindle-rail 2 and in a bracket 57, which has a tubular sleeve or bearing 58. A gear 59 is fixed upon the bottom of the shaft 56, and at the upper end of the shaft 56 is a worm 60. The gear 59 is in engagement with the gear 10 of the spindle 9.

A standard or post 61 is supported at its base 62 on the capstan-rail 3. On the standard 61 is rotatably mounted a gear 63, which is engageable by the worm 60. The gear 63 has a pinion 64 connected with it. A gear 65 is rotatably mounted on the standard 61 and is engageable with the gear 64. A take-up drum 66 is mounted and fixed upon the same shaft 67 to which the gear 65 is secured, said shaft 67 being mounted in the standard 61 and in the standard 68. The take-up drum 66 has a grooved wheel or pulley 69 fastened to it. A set-screw 104 passes through the drum 66 and secures it in position upon the shaft 67. At the top of the standard 61 is pivotally mounted a belt-tightening arm 70, on the end of which is a grooved wheel 71.

Top rails 72 extend lengthwise of the machine on both sides, as seen in Fig. 10. On these top rails 72 are mounted a number of collars 73, which are fixed in position thereon by any suitable means, from each of which collars extends a bracket 74, and on the end of each bracket 74 is a semitubular spool-holder 75. Between two adjacent spool-holders 75 is mounted the spool 76, upon which the finished wire $41^a$ is wound. Each spool is provided with an arbor, secured thereto by a pin or otherwise, the arbor resting on the spool-holder 75, and on each arbor and adapted to turn said arbor and its connected spool 76 there is a small pulley 77. (See Fig. 10.) A belt 78 passes around the grooved wheel or pulley 69 of the take-up drum 66 and the pulley 77, the belt-tightener and roll serving to draw the belt to a proper tension.

On a vertical shaft 79, Fig. 10, properly mounted and rotatable by suitable gear connection (not shown) with the main driving-shaft of the machine is a heart-shaped cam 80. A collar 81 is fixed on one of the top rails 72, and on said collar (upon a side extension thereof) is pivotally mounted at its center a V-shaped lever 82. At the outer end of the lever 82 is a friction-roller 83, rotatably mounted and in contact with the cam 80. There are two cross-bars 84 and 85, having holes through them, by which they are slidably mounted on the top rails 72. Said cross-bars 84 and 85 are connected by braces or rods 86 and 87. The cross-bars 84 and 85 terminate at their ends in rods 88, 89, 90, and 91, respectively. A link-bar 92, pivotally connected with the cross-bar 84, is also pivotally connected with the inner end of the bent lever 82. A cord 93 is fastened to the center of the cross-bar 85 at 94, which cord passes over a pulley 95 at the end of the machine which is opposite to the cam 80, and a weight 96 is suspended from the cord 93.

On the rods 88 and 90 is fastened the traverse-rails 97, on which are loosely mounted the traverse-whirls 98. On the rods 89 and 91 is fastened the traverse-rail 99, carrying the loose traverse-whirls 100. The whirls 98 and 100 are held from lateral movements on the rails, whereon they are loosely mounted, by means of collars on each side of said whirls, respectively, (shown in Figs. 1 and 10,) which collars are secured upon said rails (97 or 99) in any suitable manner.

It is to be understood that the Figs. 1 and 2 of the drawings represent only one section of the mechanism. There are to be used on the machine and on both sides of the machine as many sections as there are traverse-whirls 100.

At 102, Figs. 1 and 2, is shown a nut (preferably provided with three arms) fitting on the screw-threaded outer end of the shaft 67, which at said end is concentrically reduced in diameter to form an annular shoulder 103.

A trough 104 is supported on brackets 105. A shaft 106 rests in supports 107, provided with journals 108, Fig. 12, and wheels 109, each having a V-shaped peripheral groove, are rotatably mounted on the shaft 106. The brackets 105 have each a collar 110, which is fixed upon a rod or shaft 111. The brackets 112 are in like manner supported by the rod or shaft 111, and each bracket 112 has a semitubular bearing 113 at its upper end. Reels 114, having supplies of wire, are rotatably mounted in the bearings 113. A tension device or arm 115 is mounted on the shaft 106 between each reel 114 and wheel 109 of the same vertical series.

Having described the parts of my machine, I will proceed to explain its operation.

Power is communicated from the main shaft by the pulley 53 and belt 55 to the pulley of the whirl 8. (See Fig. 2.) The revolution of the whirl 8 rapidly rotates the spindle 9, which is supported thereby, and the flier 14 and its connected parts, together with the spools 25 26, rotate with the spindle 8. The wire 41, which is to be covered by the threads 30 31, passes from the reel 114 over and partially around the grooved wheel 109, and so is carried through the trough 104, which contains liquid shellac or other similar liquid by which the wire is wet. In passing from the reel 114 to the peripherally-grooved wheel 109 the wire is subjected to a downward strain exerted upon it by the loosely-mounted tension arm or device 115. The wire 41 passes up from the grooved wheel 109 and enters, through the short tube 13 at the bottom of the spindle 9, up, through, and along the bore of the spindle. From and above the winding-head 36 said wire, being covered by the threads 30 31 then wound upon it, is designated in the drawings as $41^a$. The covered wire $41^a$ passes around the take-up drum 66 in the beveled groove thereof, (see Fig. 1,) thence over the traverse-whirl 98 to the spool 76. The spindle 9 is made and operates on the principle of a top, having no support at its upper end, and it rotates with great rapidity, being supported entirely by the tapering bore of the whirl 8. The tubular cork packing 7 between the interior of the bolster 4 and the exterior of the bearing 6, having a slight elasticity, serves to prevent improper vibration of the spindle 9 while the latter is rotating. The balance-wheel 22, mounted fast on the spindle 9 within the flier 14, which is mounted loosely on the whirl 8, gives by its momentum great steadiness of motion to the spindle and the flier. The hooks or lugs 18 of the lower cross-bar 16 of the flier afford a quick and efficient means of engaging the flier 14 to the whirl 8, said hooks or lugs 18 passing down through the slots 19 of the flange 20 of the whirl 8. When said lugs 18 have so entered said slots 19, the hook ends of the lugs are below the plane of the whirl-flange 20, and when the flier has been partially rotated until one of said lugs 18 comes into contact with the stop-pin of the whirl-flange 20 the flier is locked in position upon the top of the whirl 8 against vertical displacement. By the tension-spring 33 (illustrated in Fig. 8) a regulated pressure is exerted against the rim of the spool 25, which is loosely mounted on the spindle 9 within the flier 14, and so overrotation of said spool caused by the draft of the thread 30 therefrom is prevented, and consequently the paying out of the thread from said spool is exactly regulated. A similar tension-spring device operates to regulate the paying out of the thread 31 from the spool 26, but is not shown in the drawings. The threads 30 and 31 on leaving the spools 25 and 26 pass, respectively, through the thread-holes 28 and 29 and thence between the exterior surface of one of the upright arms of the flier 14 and the inner surface of the wind-shield 27, as indicated by dotted line in Figs. 3 and 4, and thence through the eye 52 of the projection 51. The purpose of the wind-shield 27 is to prevent the ballooning of the threads after they have passed the thread-holes 28 and 29, which ballooning or outward bulge would otherwise take place, owing to the great momentum of the flier and the rapid paying out of the thread from the spools 25 and 26, and in consequence of which, if not so prevented, said ballooning threads would be liable to be caught and broken. In Figs. 13, 14, and 15 is shown (on an enlarged scale) the means by which the threads are spread apart and wound flat upon the wire. After the threads 30 and 31 have passed through the eye 52 of the projection 51 they pass through the lower part of the eye 50 of the porcelain eyepiece in an angular direction, as seen in Fig. 15, and in the bevel of said eye 50 said threads are separated and properly distributed or located for winding. From the porcelain eyepiece 49 said threads so spread apart pass to the rounded part of the wire-holder 39 (indicated by the curved dotted line in Fig. 6) and are wound upon the wet wire 41 by the wire-holder, which rapidly rotates around it. The wire 41 passes very loosely up through the bore of the spindle 9 and loosely up along and through the longitudinal groove or channel 40 in said wire-holder, (see Fig. 5,) and it is prevented from leaving said groove 40, because the wedge-shaped end of the wire-guard 46 partially enters said groove, as illustrated in Figs. 5, 6, and 15. The winding-head 36 is longitudinally adjustable upon the cross-head 15 of the flier because of the elongation of the slots 37, through which the screws 38 pass, which hold the winding-head to said cross-head. The eyepiece post 47 is adjustable lengthwise or in a rotary direction in the smooth-bored hole therefor in the winding-head 36 and held in adjusted position by the set-screw 48. The wire-holder 39 is adjustable in a longitudinal or rotary direction in the smooth-bored hole therefor in the winding-head 36 and held in adjusted position by the screw 43. The wire-guard 46 is adjustable longitudinally through the end of the post 44 and held in adjusted position by the set-screw 43, while the post 44 is adjustable longitudinally and in a rotary direction in the smooth-bored hole therefor in the winding-head 36 and held in adjusted position by the set-screw 101.

The abundant capacity of adjustment of the winding-head, as well as of all its component parts, affords perfect control of the winding operation, and, moreover, allows the interchangeability of parts and their detachment for repair or otherwise and also permits the change of the positions of the eyepiece-post 47 and the wire-guard post 44 (with its wire-guard 46 thereon) from one side of the winding-head 36 to the other, thus enabling the winding of the thread in either direction.

The traverse mechanism (illustrated in Figs. 1, 2, and 10) gives the proper travel to the whirls 98 to lay the completed wire 41ª smoothly and evenly upon the spools 76 in winding.

By disengaging the nut 102 the gear 65 is disconnected from the shaft 67 and runs loose thereon, thereby stopping the rotation of the take-up drum 66, and the stopping of said drum 66 stops the operation of the pulleys 69 77, so that the covered wire 41ª is no longer wound on the spool 76. I prefer to make said nut 102 with three arms in order that it may more conveniently be operated.

By the gear 65 (which derives motion from the gear 59, meshing with the gear 10) the drum 66 is rotated whenever the nut 102 binds the gear 65 to the shaft 67. It is the rotation of the drum 66 which draws the wire 41 from the reel at the bottom up through the bore of the spindle 9. Said wire after it is covered passes several times around the drum 66 and thence over the traverse-whirl 98 to the spool 76. By loosening the set-screw 104 the drum 66 is disconnected from the shaft 67 wherever desired and adjusted so that its beveled groove may be brought into proper adjustment with the wire-holder 39, whereupon the set-screw is turned to hold the drum in such adjusted position.

By the downwardly-extending projection of the tube 13 below the open bottom of the spindle 9, as shown in Fig. 4, the oil upon the exterior surface of the spindle is prevented from coming by gravity into contact with the wire 41, which passes up through the bore of said spindle.

By means of the adjustment of the winding-head 36 upon the upper bar or cross-head 15 of the flier 14, which is possible by the passage (and securing in position) of the screws 38 in the elongated slots 37, said winding-head is laterally movable upon the flier to whatever extent may be necessary for properly balancing it upon the flier. The importance of this adjustability is apparent when it is considered that the flier, spindle, and connected parts are supported only by the bolster and that if the winding-head were not thus adjustable it could not be accurately centered to properly balance the load.

To remove the spools from the flier when the thread thereon has been exhausted, the flier is turned in the reverse direction until the lugs 18 18 of the cross-bar 16 thereof come opposite the slots 19 19 on the annular flange 20, near the top of the whirl 8, (see Fig. 3,) whereupon the flier can be raised, enabling the removal of the spools therefrom.

I claim as a novel and useful invention and desire to secure by Letters Patent—

1. In a machine for winding thread upon a wire, the combination of a rotatable spindle having a central longitudinal bore adapted to receive loosely a wire passing therethrough, which bore is enlarged at the bottom of the spindle, and a short tube inserted into said spindle-bore at the bottom thereof, substantially as and for the purpose specified.

2. In a machine of the class described, the combination of a bolster-rail, a bolster mounted therein and having an enlarged concentric chamber in its upper portion, a tubular bearing supported in and by the bolster, a spindle-whirl supported by said tubular bearing, a spindle supported in and by said spindle-whirl and a tubular cork packing surrounding said bearing in the said chamber of the bolster, substantially as shown.

3. In a machine of the class described, the combination of a bolster-rail, a bolster mounted therein, and having an enlarged concentric chamber in its upper portion, a tubular bearing supported in and by the bolster, a spindle-whirl supported by said tubular bearing, a spindle supported in and by said spindle-whirl, and a tubular packing made of an elastic material surrounding the bearing in said chamber of the bolster, substantially as set forth.

4. In a machine of the class described, the combination of a bolster-rail, a bolster mounted therein, and open at the bottom, an open-bottomed tubular bearing supported in and by the bolster, a spindle-whirl supported on said tubular bearing, a spindle supported by the spindle-whirl and extending below the bolster-rail and out below the open bottom of the bolster and bearing, a gear mounted fast upon the bottom of the spindle, means to rotate said spindle-whirl, and mechanism operated by said gear and adapted to draw a wire up through the spindle, substantially as described.

5. In a machine of the class described, the combination of a bolster-rail, a bolster mounted therein, and having an open bottom, an open-bottomed tubular bearing supported in and by the bolster, a spindle-whirl supported by the bearing, a spindle supported in and by said whirl, provided with a central longitudinal bore, and having its lower end extended below the bolster-rail and out below the open end of the bolster and bearing, a gear mounted fast upon the lower end of the spindle, a properly-mounted shaft, a gear fixed upon the bottom of said shaft, and engageable with the first-named gear, and mechanism operated by the said shaft adapted to draw a wire up through the spindle, substantially as shown and for the purpose specified.

6. In a machine of the class described, the combination of a rotatable spindle, properly mounted and having a central longitudinal bore, means adapted to rotate said spindle, and a balance-wheel mounted on and rotated by said spindle, substantially as described.

7. In a machine of the class described, the combination of a rotatable spindle, having a central longitudinal bore and supported at its lower part but not at its upper part, means adapted to rotate the spindle, and a balance-wheel mounted on and rotated by said spindle, substantially as shown.

8. In a machine of the class described, the combination of a rotatable spindle, properly mounted, and having a central longitudinal bore for the passage of a wire therethrough, means adapted to rotate the spindle, a flier arranged and adapted to rotate with the spindle, devices carried by the flier arranged and adapted to wind thread from a spool or spools upon said wire, and a balance-wheel mounted on and rotated by the spindle, substantially as set forth.

9. In a machine of the class described, the combination of a properly-mounted spindle-whirl, having at its top a flange with diametrically opposite radial slots, a spindle mounted in the spindle-whirl, a flier, whose lower cross-piece has two diametrically opposite hook-end lugs adapted to enter said slots, respectively, and which is capable of partial rotation, and a stop-pin projecting from said flange and arranged to limit the rotation of said cross-piece, substantially as described.

10. In a machine of the class described, the combination of a properly-mounted rotatable spindle having a central longitudinal bore adapted to allow the passage of a wire therethrough, means adapted to rotate the spindle, a flier properly mounted and rotatable with the spindle and having an upright arm, a winding device carried by the flier and adapted to wind thread upon the wire, and a wind-shield attached to said upright arm and having its outer edge extending along and parallel with the outer side of said upright arm and arranged so as to allow the unobstructed passage of thread between said arm and windshield, substantially as shown.

11. The combination of a flier properly mounted, a spindle passing through said flier and carrying a spool or spools, a balance-wheel mounted fast on said spindle, and a tension-spring attached to the balance-wheel, with its free end in forcible contact with the rim of the spool, substantially as specified.

12. The combination of a flier properly mounted, a spindle passing through said flier, a balance-wheel mounted fast on said spindle, a screw fixed in said balance-wheel, a bent spring passing around said screw, and a set-screw passing through a flange of the balance-wheel and having its end bearing against one end of said spring, substantially as described.

13. In a machine of the class described, the combination of a properly-mounted spindle having a central longitudinal bore adapted for the passage of wire therethrough, means adapted to rotate said spindle, a flier properly mounted and rotatable with said spindle and having an upper cross-bar, a winding device having two elongated slots at its opposite ends, and headed screws passing through said slots into the cross-bar, substantially as specified.

14. In a machine of the class described, the combination of a rotatable spindle having a central longitudinal bore for the passage of a wire therethrough, a flier properly mounted and rotatable with said spindle, a winding-head mounted upon said flier, a wire-holder having a longitudinal groove for the passage of said wire in a line with said bore of the spindle and loosely mounted in a vertical hole through said winding-head, a set-screw passing through the side of the winding-head and capable of securing the wire-holder in its adjusted position, and a post on said winding-head terminating with a porcelain eye, substantially as described.

15. In a machine of the class described, the combination of a rotatable spindle having a central longitudinal bore for the passage of a wire therethrough, a flier properly mounted and rotatable with said spindle, a winding-head mounted upon said flier, a wire-holder having a longitudinal groove for the passage of said wire in a line with the bore of said spindle, a post loosely mounted in a hole in said winding-head and terminating with a porcelain eye, and a set-screw passing through the side of the winding-head and capable of securing said post in its adjusted position, substantially as specified.

16. In a machine of the class described, the combination of a rotatable spindle having a central longitudinal bore for the passage of wire therethrough, a flier properly mounted and rotatable with said spindle, a winding-head mounted upon said flier, a wire-holder having a longitudinal groove for the passage of said wire in a line with the bore of said spindle, a post terminating with a porcelain eye, mounted in said winding-head, and adjustable with relation to said wire-holder, and means of securing said post in its adjusted position, substantially as shown.

17. In a machine of the class described, the combination of a rotatable spindle having a central longitudinal bore for the passage of wire therethrough, a flier properly mounted and rotatable with said spindle, a winding-head mounted upon said flier, a wire-holder having a longitudinal groove for the passage of said wire in a line with the bore of said spindle, a post mounted upon said winding-head and having a wedge-shaped projection which enters the groove of the wire-holder arranged substantially as and for the purpose specified.

18. In a machine of the class described, the combination of a rotatable spindle having a central longitudinal bore for the passage of wire therethrough, a flier properly mounted and rotatable with said spindle, a winding-head mounted upon said flier, a wire-holder having a longitudinal groove, for the passage of said wire in a line with the bore of said spindle, and a post mounted and adjustable upon said winding-head in both perpendicular and rotary directions and having a wedge-shaped projection which enters the groove of the wire-holder, arranged as and for the purpose specified.

19. In a machine of the class described, the combination of a rotatable spindle having a central longitudinal bore for the passage of a wire therethrough, a flier properly mounted and rotatable with said spindle, a winding-head mounted upon said flier, a wire-holder having a longitudinal groove for the passage of wire in a line with the bore of said spindle, a post loosely mounted in a vertical hole in the winding-head, a set-screw passing through the side of the winding-head and capable of holding said post in its adjusted position, and a wedge-shaped projection from said post, which enters the groove of the wire-holder, arranged substantially as shown and for the purpose specified.

20. In combination with a flier for winding thread upon a wire, a winding-head, having a wire-holder, which is provided with a longitudinal groove, and a post mounted upon the winding-head and provided with a wedge-shaped projection adapted to enter said groove, substantially as specified.

21. In combination with a flier for winding thread upon a wire, a winding-head, having a wire-holder thereon, which is provided with a longitudinal groove, a post adjustably mounted on said winding-head, means for holding said post in its adjusted position, and a wedge-shaped projection extending from said post and adapted to enter said groove, substantially as described.

22. In combination with a flier for winding thread upon a wire, a winding-head, having a wire-holder thereon, which is provided with a longitudinal groove, a post mounted upon said winding-head, a wire-guard mounted movably in said post at an angle thereto, and adapted to enter said groove, and a set-screw mounted in said post and capable of securing said arm in adjusted position with relation to said post, substantially as shown.

23. In combination with a flier for winding thread upon a wire, a winding-head, having a wire-holder thereon, which is provided with a longitudinal groove, a post mounted adjustably on said winding-head, a set-screw adapted to hold said post in its adjusted position, and a wire-guard mounted movably in said post at an angle thereto and adapted to enter said groove and a set-screw mounted in said post and capable of securing said arm in adjusted position in relation to said post, substantially as set forth.

24. In combination with a flier for winding thread upon a wire, a winding-head, having a centrally-located wire-holder, which is rotatably mounted in a vertical hole in said winding-head, and provided with a longitudinal groove, a set-screw arranged to secure said wire-holder in position, two vertical holes through the respective ends of the winding-head, two posts longitudinally and rotatably mounted in said holes, respectively, one of which posts has at its upper end a thread-spreading eyepiece, and the other of which posts has at its upper end an angularly-projecting wire-guard adapted to enter said groove, each of said posts, respectively, being capable of attachment and detachment on either side of said wire-holder, and a set-screw arranged to hold each of said posts in its adjusted position, substantially as described.

25. In a machine for covering wire, the combination of a longitudinally-bored spindle and means of supporting and rotating same, a flier properly mounted and rotatable with said spindle and having a winding device, a gear upon the lower end of the spindle, a vertical shaft properly mounted, having at its upper end a worm and at its lower end a gear engageable with the first-named gear, two standards, a horizontal shaft mounted in said standards having an annular shoulder and a screw-threaded reduced end, a train of gears mounted upon one of the standards, one of which gears is engageable with said worm and another of which gears is loose on said horizontal shaft, a nut engageable with the screw-threaded end of the horizontal shaft and adapted when screwed up to connect the last-named gear with the horizontal shaft so as to rotate said shaft, a drum fixed upon the horizontal shaft and having a grooved pulley, and a second pulley and a belt passing over both said pulleys, said wire being arranged after passing through the winding device to pass over said drum and to be wound on a spool connected with the last-named pulley, substantially as specified.

26. In a machine of the class described, the combination of means for feeding wire to the machine and for winding thread upon the wire, and for reeling said wire when so wound, parallel top rails, collars on said top rails, each having a bracket which terminates in a semitubular bearing, detachable arbors mounted in said bearings and pulleys on said arbors, respectively, two parallel cross-bars extending at right angles with said top rails and each having two apertures by which they are mounted and movable on said top rails, cross-braces adapted to strengthen said cross-bars, an arm extending from each end of each cross-bar in the line thereof, respectively, two parallel traverse-bars mounted on the outer ends of said arms, respectively, traverse-whirls rotatably mounted upon said traverse-bars contiguous to said arbors, respectively, a vertical shaft properly mounted and rotated, a cam fixed upon the top of said shaft, a collar on one of said top rails having a side extension, a V-shaped lever centrally pivoted to the said side extension of the last-named collar, a friction-roller rotatably mounted on one end of said lever and in contact with the said cam, a link-bar pivotally connected at one end to the center of one of said cross-bars and pivotally connected at its opposite end to the other end of said lever, a cord connected with the other of said cross-bars at the center thereof, a pulley properly supported over which the cord passes, and a weight at the end of said cord, substantially as described.

27. In a machine of the class described, having mechanism for feeding the wire and covering the wire with thread and reeling the covered wire upon spools, the combination of a horizontal shaft, a take-up drum loosely mounted on said shaft in a position intermediate the winding and reeling mechanism aforesaid, and over which drum the covered wire passes, and a set-screw passing through a portion of the drum and adapted to connect it with the shaft so as to be rotatable therewith, substantially as described.

In testimony whereof I affix my signature in presence of two witnesses.

GEORGE T. NICHOLLS.

Witnesses:
 JOSEPH B. BULLOCK, Jr.,
 HOWARD A. LAMPREY.